United States Patent [19]
Vreeland et al.

[11] Patent Number: 5,956,888
[45] Date of Patent: Sep. 28, 1999

[54] GLITTER FISHING LURE

[76] Inventors: B. Vic Vreeland, P.O. Box 1050, Jenks, Okla. 74037; Dennis J. Montgomery, P.O. Box 741, Georgetown, Ga. 31754

[21] Appl. No.: 09/088,955

[22] Filed: Jun. 2, 1998

[51] Int. Cl.$^6$ .................................................. A01K 85/00
[52] U.S. Cl. ....................... 43/42.53; 43/42.24; 43/42.33; 427/180; 264/131
[58] Field of Search ................................ 43/42.24, 42.32, 43/42.33, 42.53; 264/131; 427/180; 156/245, 297

[56] References Cited

U.S. PATENT DOCUMENTS

| | | | |
|---|---|---|---|
| Re. 31,780 | 12/1984 | Cooper et al. | |
| Re. 35,160 | 2/1996 | Nichols | 43/42.53 |
| 2,338,096 | 1/1944 | Chater | 427/180 |
| 2,987,104 | 6/1961 | Benedict | 427/180 |
| 3,687,800 | 8/1972 | Scheppers | 427/180 |
| 3,697,238 | 10/1972 | Brown et al. | 427/180 |
| 3,879,883 | 4/1975 | Strader | 43/42.32 |
| 3,989,775 | 11/1976 | Jack et al. | 264/131 |
| 4,141,170 | 2/1979 | Fosher | 43/42.24 |
| 4,214,397 | 7/1980 | Kent | 43/42.53 |
| 4,307,531 | 12/1981 | Honse | 43/42.32 |
| 4,312,148 | 1/1982 | Hardwicke, III | 43/42.24 |
| 4,530,179 | 7/1985 | Larew | 43/42.24 |
| 4,862,631 | 9/1989 | Wilson et al. | 43/42.33 |
| 4,887,376 | 12/1989 | Sibley et al. | 43/42.24 |
| 4,912,871 | 4/1990 | Brady | 43/42.32 |
| 4,953,319 | 9/1990 | Kasper et al. | 43/42.24 |
| 5,007,193 | 4/1991 | Goodley et al. | 43/42.53 |
| 5,333,405 | 8/1994 | Bowles | 43/42.24 |
| 5,353,540 | 10/1994 | Ward | 43/42.24 |
| 5,408,780 | 4/1995 | Chambers, Sr. | 43/42.53 |
| 5,490,344 | 2/1996 | Bussiere | 43/42.24 |

FOREIGN PATENT DOCUMENTS

| | | | |
|---|---|---|---|
| 516227 | 9/1955 | Canada | 43/42.32 |

OTHER PUBLICATIONS

Lure #1 prior public use and sale, described in Information Disclosure Statement (IDS).

Lure #2, prior public use and sale, described in Information Disclosure Statement (IDS).

*Primary Examiner*—Michael J. Carone
*Assistant Examiner*—Darren W. Ark
*Attorney, Agent, or Firm*—Gary Peterson; Pray, Walker, Jackman,; X Williamson & Marlar

[57] ABSTRACT

A glitter fishing lure formed from a liquid plastisol in which a vinyl resin has been dispersed in primary and secondary plasticizers. The primary plasticizer is an adipate or phthalate ester, the secondary plasticizer is a hydrocarbon, and the weight ratio of the primary to secondary plasticizer is preferably at least about 1.5, and more preferably about 5.25. The plastisol is heated to at least about its fusion temperature, and shaped in a mold to form a lure body. Once the lure body has cooled and hardened, it has a tacky outer surface. The lure body is agitated in the presence of thermoplastic first glitter flakes under dry conditions, so that the first glitter flakes adhere to the tacky outer surface of the lure body.

8 Claims, No Drawings

GLITTER FISHING LURE

FIELD OF THE INVENTION

The present invention relates generally to artificial fishing lures, and more particularly to such lures incorporating glittery materials for the attraction of fish, as well as methods for making such lures.

SUMMARY OF THE INVENTION

The present invention comprises a method of making a soft plastic fishing lure in which a liquid plastisol, formed by dispersing a vinyl resin in a plasticizer, is heated to at least about its fusion temperature, and shaped in a mold to form a lure body. Once the lure body has cooled and hardened, it is agitated in the presence of thermoplastic first glitter flakes under dry conditions, such that first glitter flakes adhere to the outer surface of the lure body.

One soft plastic fishing lure which may be produced in accordance with the method is formed from a molded soft vinyl plastic, having a primary plasticizer consisting essentially of one or more compounds selected from the group consisting of phthalate and adipate esters of alcohols having between about 6 and about 11 carbon atoms, and a secondary plasticizer consisting essentially of one or more hydrocarbons. The weight ratio of the primary plasticizer to the secondary plasticizer is at least about 1.5. A plurality of thermoplastic first glitter flakes are attached by adhesion to the tacky outer surface of the lure body.

DETAILED DESCRIPTION OF THE PREFERRED EMBODIMENTS

The present invention comprises an artificial fishing lure formed from a soft and flexible plastic capable of simulating the appearance, movement and texture of live bait. The soft plastic used in the invention is preferably formed from a vinyl resin, such as polyvinyl chloride. Although vinyl chloride homopolymers are preferred, the resin may also comprise a vinyl chloride copolymer, such as a copolymer of vinyl chloride and a vinyl ester, such as vinyl acetate.

The fishing lure of the present invention is made from a fluid plastisol which has been formed by dispersing the vinyl resin in a plasticizer. The plasticizer, which enhances the flexibility and durability of the resulting lure, comprises a primary plasticizer and, optionally, a secondary plasticizer. Preferably, the total plasticizer content (both primary and secondary) is between about 350 and about 600 phr (weight parts of plasticizer per hundred weight parts of resin).

The primary plasticizer preferably consists essentially of one or more compounds selected from the group consisting of phthalate and adipate esters of alcohols having between about 6 and about 11 carbon atoms. Suitable primary plasticizers for use in the present invention include: di(2-ethyl) hexyl phthalate, also known as dioctyl phthalate or DOP; diisononyl phthalate, also known as DINP; mixtures of the phthalate esters of alcohols having 7 and 9 carbon atoms, commercially marketed under the name "79P"; mixtures of the phthalate esters of alcohols having 7, 9 and 11 carbon atoms, commercially marketed under the name "711P"; and di(2-ethyl)hexyl adipate, also known as dioctyl adipate or DOA. Particularly preferred for use in the present invention di(2-ethyl)hexyl phthalate.

The plasticizer may further comprise a secondary plasticizer, which may function as an extender for the primary plasticizer. The secondary plasticizer, if any, must be miscible with the vinyl resin, and must not interfere with the primary plasticizer. Preferably, the secondary plasticizer consists essentially of one or more hydrocarbons, such as aliphatic and aromatic hydrocarbons and mixtures thereof. Particularly suitable secondary plasticizers include byproducts of petroleum refining, such as napthenic oils and mineral seal oils.

In addition to primary and secondary plasticizers, other additives, such as fillers, stabilizers, pigments, fish attractants and flavor ingredients (such as salt) may be added to the liquid plastisol, preferably with thorough mixing. Examples of such additives are described in U.S. Patent No. U.S. Pat. No. 4,530,179, the entire disclosure of which is incorporated by reference.

Following incorporation of these additives, the plastisol is heated to at least about its fusion temperature, preferably in a heat exchanger. In one preferred embodiment, the plastisol is heated to at least about 300° F., and more preferably to about 340° F. The heated plastisol then is transferred to a mold, preferably in an injection molding apparatus, where it is shaped to form a lure body. Preferably, the mold is shaped so as to form a lure body which resembles an aquatic bait, such as a frog, insect, worm, eel or small fish. After molding is complete, the lure body is allowed to cool and harden.

In the lure of the present invention, the outer surface of the lure must be at least somewhat tacky, with a moderate to high degree of tackiness preferred. Specifically, the outer surface of the lure must be sufficiently tacky to permit the sustained adhesion of the first glitter flakes to be described hereafter. Although the disclosed primary plasticizers are capable of producing such a tacky surface for the lure, the disclosed secondary plasticizers have the potential to partially or substantially mask this important characteristic. This is because the secondary plasticizers are more volatile than the primary plasticizers, and can preferentially migrate to the outer surface of the lure, producing surface lubrication.

In order to enhance the tackiness of the surface of the lure body, the outer surface of the lure body of the present invention is preferably sufficiently tacky to permit sustained adhesion of first glitter flakes. This surface characteristic is preferably achieved by controlling the weight ratio of primary to secondary plasticizer: this ratio preferably is at least about 1.5, and more preferably at least about 4.8. Most preferably, the weight ratio of primary to secondary plasticizer is between about 4.8 and about 5.8, with about 5.25 being particularly preferred.

In order to impart a reflective or iridescent sheen to the lure body, as might be desired to simulate the appearance of scales, a plurality of first glitter flakes are attached to the outer surface of the cooled lure body. The first glitter flakes are preferably formed from an layered thermoplastic iridescent film, such as that described in U.S. Pat. No. Re. 31,780, the entire disclosure of which is incorporated by reference. Such films are available commercially, in a range of optical characteristics, from The Mearl Corporation, subsidiary of Engelhard Corporation, Ossining, N.Y. In one preferred embodiment of the present invention, the glitter flakes are substantially transparent. Alternatively, the first glitter flakes may comprise a non-transparent metallized thermoplastic film.

The glitter flakes are preferably substantially flat, shaped as a polygon or other compact geometric figure, and preferably between about 0.0002 and about 0.002 inches in thickness. A preferred thickness is about 0.0005 inches. The major portion of the first glitter flakes are preferably characterized by an exposable surface area of between about 0.000001 and about 0.0003 square inches, and more preferably between about 0.000001 and about 0.0001 square inches. One preferred flake configuration is a regular hexagon having a width of 0.008 inches and thickness of 0.0005 inches. Precut glitter, in a range of colors, optical characteristics and sizes, is available commercially from Meadowbrook Inventions, Inc., of Bernardsville, N.J. A particularly preferred variety of precut substantially transparent iridescent glitter is marketed by this firm under the product name Crystalina.

To attach the first glitter flakes to the lure body, the lure body is agitated under dry conditions with a plurality of first glitter flakes, preferably in an agitating device such as a rotary mixer or jewelry tumbler. Because of the tackiness of the outer surface of the lure body, many of the first glitter flakes adhere to the outer surface of the lure body. The agitation is conducted for long enough to assure an approximately uniform distribution of the first glitter flakes over the outer surface of the lure body. In one embodiment of the invention, the first glitter flakes are agitated for between about 2 minutes and 10 minutes, and more preferably for about 5 minutes. Once an approximately uniform surface distribution has been achieved, the finished lured is removed from the agitating device.

Because the first glitter flakes adhere to the tacky outer surface of the lure, their visual impact is not obscured by the polymeric resin forming the lure body. This feature permits use of relatively small sizes of glitter flakes, without substantial sacrifice of the visual impact of the flakes. Because of their relative size, such smaller-sized flakes also fit more closely against the relatively complex three-dimensional surfaces which characterize most lure bodies. Such a closer fit contributes to better adhesion of the first glitter flakes to the lure body, and to lesser shedding of glitter flakes when the lure is in use, in transit, and on the shelf.

In order to produce more complex reflective or iridescent effects, it may be desirable in some instances to incorporate a plurality of second glitter flakes into the internal structure of the lure body. In this event, the second glitter flakes may be dispersed in the plastisol while the plastisol is in its liquid state, at or near the time that other additives are added, as described above. The internally dispersed second glitter flakes preferably comprise the same kinds of iridescent and metallized polyester films which were described with reference to the first glitter flakes. Preferably, the second glitter flakes are characterized by specific gravity characteristics comparable to those of the liquid plastisol, so that the second glitter flakes will not aggregate in the upper or lower portion of the mold, and will instead be approximately evenly distributed.

Because the second glitter flakes are dispersed internally within the lure body, the vinyl resin will tend to obscure the second glitter flakes and reduce their visual impact. In order to assure the visibility of these second glitter flakes in this environment, they are preferably characterized by a predominantly larger size than the first glitter flakes. The major portion of the second glitter flakes are preferably characterized by an exposable surface area of between about 0.0002 and about 0.005 square inches.

In most instances, it will be preferred that the second glitter flakes have optical characteristics different than those of the first glitter flakes. For example, in some embodiments it may be desirable for the first glitter flakes to be substantially transparent and untinted, in order to permit better display of the internally disposed second glitter flakes, which may be substantially opaque and tinted.

The finished lure may be mounted on a hook, either by the manufacturer or by the end user, and used for fishing. The first glitter flakes impart a lifelike scaly sheen to the surface of the lure, which complements the lifelike lure movement made possible by the flexible soft plastic used to form the lure body. These lifelike features attract feeding fish, and motivate them to bite the lure.

Changes may be made in the construction, operation and arrangement of the various compositions, elements, steps and procedures described herein without departing from the spirit and scope of the invention as defined in the following claims.

What is claimed is:

1. A method of making a soft plastic fishing lure, comprising:

heating a liquid plastisol, which has been formed by dispersing a vinyl resin in a plasticizer, to at least about its fusion temperature;

shaping the heated plastisol in a mold to form a lure body;

allowing the lure body to cool and harden; and agitating the lure body in the presence of thermoplastic first glitter flakes under dry conditions, such that first glitter flakes adhere to the outer surface of the lure body.

2. The method of claim 1 in which a major portion of the first glitter flakes have an exposable surface area of between about 0.000001 and about 0.0001 square inches.

3. The method of claim 1 in which the liquid plastisol is further characterized as having a plurality of second glitter flakes dispersed therein.

4. The method of claim 3 in which a major portion of the first glitter flakes have an exposable surface area of between about 0.000001 and about 0.0001 square inches, and in which a major portion of the second glitter flakes have an exposable surface area of at least about 0.0002 square inches.

5. The method of claim 1 in which the plasticizer comprises a primary plasticizer consisting essentially of one or more compounds selected from the group consisting of phthalate and adipate esters of alcohols having between about 6 and about 11 carbon atoms, and a secondary plasticizer consisting essentially of one or more hydrocarbons, and in which the weight ratio of the primary plasticizer to the secondary plasticizer is at least about 1.5.

6. The method of claim 5 in which the weight ratio of the primary plasticizer to the secondary plasticizer is at least about 4.8.

7. The method of claim 6 in which the weight ratio of the primary plasticizer to the secondary plasticizer is between about 4.8 and about 5.8.

8. The method of claim 1 in which the plasticizer comprises a primary plasticizer consisting essentially of one or more compounds selected from the group consisting of phthalate and adipate esters of alcohols having between about 6 and about 11 carbon atoms, and a secondary plasticizer consisting essentially of one or more hydrocarbons, and in which the weight ratio of primary to secondary plasticizer is sufficiently high to produce a molded lure body having a surface which is sufficiently tacky to permit sustained adhesion of first glitter flakes.

* * * * *